(12) United States Patent
Sanso et al.

(10) Patent No.: US 10,069,838 B2
(45) Date of Patent: Sep. 4, 2018

(54) CONTROLLING CONSUMPTION OF HIERARCHICAL REPOSITORY DATA

(71) Applicant: Adobe Systems Incorporated, San Jose, CA (US)

(72) Inventors: Antonio Sanso, Allschwil (CH); Felix Meschberger, Niederdorf (CH)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/718,369

(22) Filed: Dec. 18, 2012

(65) Prior Publication Data

US 2014/0173753 A1    Jun. 19, 2014

(51) Int. Cl.
    *G06F 21/00* (2013.01)
    *H04L 29/06* (2006.01)

(52) U.S. Cl.
    CPC .................................. *H04L 63/104* (2013.01)

(58) Field of Classification Search
    CPC ........ H04L 63/104; H04L 63/10; H04L 63/08
    See application file for complete search history.

(56) References Cited

U.S. PATENT DOCUMENTS

| | | | |
|---|---|---|---|
| 7,076,558 B1 * | 7/2006 | Dunn ........................... | 709/229 |
| 7,610,390 B2 * | 10/2009 | Yared et al. .................. | 709/229 |
| 7,685,206 B1 * | 3/2010 | Mathew ............... | H04L 63/105 |
| | | | 707/785 |
| 8,364,969 B2 * | 1/2013 | King ............................ | 713/182 |
| 8,387,108 B1 * | 2/2013 | Satish et al. ...................... | 726/1 |
| 9,658,935 B1 * | 5/2017 | Velummylum ..... | G06F 11/3086 |
| 2002/0078050 A1 * | 6/2002 | Gilmour ........................... | 707/9 |
| 2002/0124053 A1 * | 9/2002 | Adams et al. ................ | 709/216 |
| 2003/0084300 A1 * | 5/2003 | Koike .......................... | 713/182 |
| 2003/0191846 A1 * | 10/2003 | Hunnicutt ........... | G06F 21/6218 |
| | | | 709/229 |
| 2004/0103203 A1 * | 5/2004 | Nichols et al. ............... | 709/229 |
| 2006/0005263 A1 * | 1/2006 | Hardt .............................. | 726/28 |
| 2007/0094248 A1 * | 4/2007 | McVeigh et al. ................. | 707/4 |
| 2007/0113187 A1 * | 5/2007 | McMullen et al. ........... | 715/742 |
| 2007/0289002 A1 * | 12/2007 | van der Horst et al. ......... | 726/9 |
| 2008/0086770 A1 * | 4/2008 | Kulkarni et al. ............... | 726/20 |
| 2008/0235234 A1 * | 9/2008 | Beedubail et al. .............. | 707/9 |
| 2009/0077099 A1 * | 3/2009 | Haustein et al. ............... | 707/10 |

(Continued)

*Primary Examiner* — Sharon Lynch
(74) *Attorney, Agent, or Firm* — Kilpatrick Townsend & Stockton LLP (57) ABSTRACT

One exemplary embodiment involves receiving, from an administrator device, a first request to provide a set of privileges to at least one of a set of users and a set of user groups to access private resources referenced by a path of a networked hierarchical repository, the set of privileges including at least one authorized access privilege. The embodiment also involves modifying a metadata associated with the private resources to indicate the set of privileges to provide to the at least one of the set of users and the set of user groups, the metadata associated with the private resources being modified to at least indicate the authorized access privilege. Additionally, the embodiment involves receiving a second request for authorized access to a set of resources associated with the networked hierarchical repository and providing the authorized access based on whether the metadata associated with the set of resources indicates to provide the authorized access.

18 Claims, 6 Drawing Sheets

(56) References Cited

U.S. PATENT DOCUMENTS

| | | |
|---|---|---|
| 2009/0254978 A1* | 10/2009 | Rouskov et al. .............. 726/4 |
| 2010/0199098 A1* | 8/2010 | King ............................. 713/182 |
| 2010/0251353 A1* | 9/2010 | Hodgkinson .................. 726/9 |
| 2011/0030045 A1* | 2/2011 | Beauregard et al. .......... 726/9 |
| 2012/0023556 A1* | 1/2012 | Schultz et al. ................. 726/4 |
| 2012/0054841 A1* | 3/2012 | Schultz et al. ................. 726/6 |
| 2012/0060207 A1* | 3/2012 | Mardikar et al. .............. 726/4 |
| 2012/0144501 A1* | 6/2012 | Vangpat et al. ............... 726/28 |
| 2012/0204221 A1* | 8/2012 | Monjas Llorente et al. ... 726/1 |
| 2012/0227087 A1* | 9/2012 | Brown et al. .................. 726/3 |
| 2012/0233666 A1* | 9/2012 | Gu .................................. 726/4 |
| 2012/0254957 A1* | 10/2012 | Fork et al. ..................... 726/6 |
| 2012/0317624 A1* | 12/2012 | Monjas Llorente et al. ... 726/4 |
| 2013/0014258 A1* | 1/2013 | Williams ....................... 726/24 |
| 2013/0036455 A1* | 2/2013 | Bodi et al. ..................... 726/4 |
| 2013/0054454 A1* | 2/2013 | Purves ................. H04L 67/306 705/41 |
| 2013/0054968 A1* | 2/2013 | Gupta ............................ 713/168 |
| 2013/0080520 A1* | 3/2013 | Kiukkonen et al. .......... 709/204 |
| 2013/0086645 A1* | 4/2013 | Srinivasan ............. H04L 63/10 726/4 |
| 2013/0133037 A1* | 5/2013 | Hwang et al. ................. 726/4 |
| 2013/0145435 A1* | 6/2013 | Fu .................................. 726/4 |
| 2013/0173712 A1* | 7/2013 | Monjas Llorente et al. ........ 709/204 |
| 2013/0185426 A1* | 7/2013 | Chevillat ....................... 709/225 |
| 2013/0222839 A1* | 8/2013 | Armstrong .................... 358/1.14 |
| 2013/0276078 A1* | 10/2013 | Rockwell ....................... 726/7 |
| 2013/0283356 A1* | 10/2013 | Mardikar et al. .............. 726/4 |
| 2014/0020051 A1* | 1/2014 | Lu et al. ......................... 726/1 |
| 2014/0040343 A1* | 2/2014 | Nickolov et al. ............. 709/201 |
| 2014/0041055 A1* | 2/2014 | Shaffer et al. ................. 726/28 |
| 2015/0200948 A1* | 7/2015 | Cairns .................... G06F 21/44 726/4 |
| 2015/0244597 A1* | 8/2015 | Maes ...................... H04L 43/08 715/736 |
| 2017/0255534 A1* | 9/2017 | Velummylum ..... G06F 11/3086 |
| 2017/0329864 A1* | 11/2017 | Micucci ................. H04L 63/08 |

* cited by examiner

CONTROLLING CONSUMPTION OF HIERARCHICAL REPOSITORY DATA

FIELD

This disclosure relates generally to computer software and more particularly relates to the creation, modification, use, and distribution of electronic content.

BACKGROUND

System administrators manage and administer networked hierarchical repositories such as internet websites, intranet websites, data repositories, and/or other repositories. For example, the networked hierarchical repositories include social networking platforms, data sharing websites, distributed network systems, networked data stores, and the like. Multiple users access the networked hierarchical repositories using credentials such as a user identifier and a password. The system administrator of the networked hierarchical repository may assign privileges related to portions of the networked hierarchical repository. For example, the system administrator may insert code or invoke a library of code to define the privileges for each user to access the portion of the repository according to encoded privileges. The code may provide privileges such as read, write, edit, delete for each specific user as it pertains to certain folders, directories, or other data paths of the repository.

Additionally, the system administrator assigns privileges such as authorized access for users to share in the private resources on the networked hierarchical repository owned by another user. For example, the private resources may include photos, videos, documents, contacts, and/or other media. Assigning privileges for sharing the private resources of another is implemented according to the open standard for authorization (also known as "OAuth"). The system administrator manually inserts the code or invokes the library of code in an application being executed on a server device that hosts the networked hierarchical repository to provide OAuth privileges for each user and/or set of users and individually assigns the privilege for authorized access to the private resources stored in various portions of the networked hierarchical repository by inserting the relevant code.

SUMMARY

Disclosed are embodiments for receiving, at a server device comprising a processor, a request to provide a set of privileges to at least one of a set of users and a set of user groups to access resources referenced by a path of a networked hierarchical repository, the set of privileges including at least one privilege for authorized access to the resources; and modifying, at the server device, a metadata associated with the resources to indicate the set of privileges to provide to the at least one of the set of users and the set of user groups for accessing the resources.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Methods and systems are disclosed for graphically assigning privileges according to the open standard for authorization ("OAuth") for users and user groups for authorized access to private resources over another user stored in various portions of a networked hierarchical repository. The disclosed embodiments provide a graphical approach for a system administrator to assign OAuth privileges via one or more user interfaces provided by a privilege service. The system administrator assigns the OAuth privileges for a user or a user group by selecting a path associated with the private resources and selecting the OAuth privilege for the path. Additionally, the system administrator selects users and/or user groups that are to receive the authorized access according to the OAuth standard. A privilege service receives the selections and provides the OAuth privilege to the specified users and/or user groups with authorized access to the private resources. Accordingly, the system administrator is not required to manually insert the code to provide OAuth privileges for each user and/or user group. Further, the system administrator is not required to individually assign the OAuth privilege for each user and/or user group. Instead, the system administrator can manipulate a user interface by selecting certain privileges for certain resources and the privilege service inserts the corresponding code to provide the selected privileges for the selected resources.

In one embodiment, the networked hierarchical repository may be based on a representational state transfer ("REST") architecture, a hyper test transfer protocol ("HTTP") architecture, and/or other architecture for implementing networked hierarchical repositories. As an example, the networked hierarchical repository may be a distributed system such as the World Wide Web. Additionally, the networked hierarchical repository may include content that is managed according to a Java platform specification for access to content repositories ("JCR"). For example, the JCR platform is used to manage the networked hierarchical repository and the metadata in the networked hierarchical repository. The networked hierarchical repository managed by the JCR platform provides the ability to store information in metadata that is associated with the content stored within the repository. However, these implementations of the networked hierarchical repository do not include a predefined security method for providing OAuth privileges thereby requiring that a system administrator and/or a developer manually define the security methods. The embodiments disclosed herein leverage the functionality provided by the JCR platform for managing the content of the networked hierarchical repository and the REST architecture of the networked hierarchical repository to provide a graphical approach for assigning OAuth privileges to private resources. To this end, the privilege service assigns an OAuth metadata associated with the private resources for providing access to users and/or user groups. When the user and/or users associated with the user group request authorized access to the private resources, an access service determines whether to provide access based at least in part on the OAuth metadata associated with the private resources.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
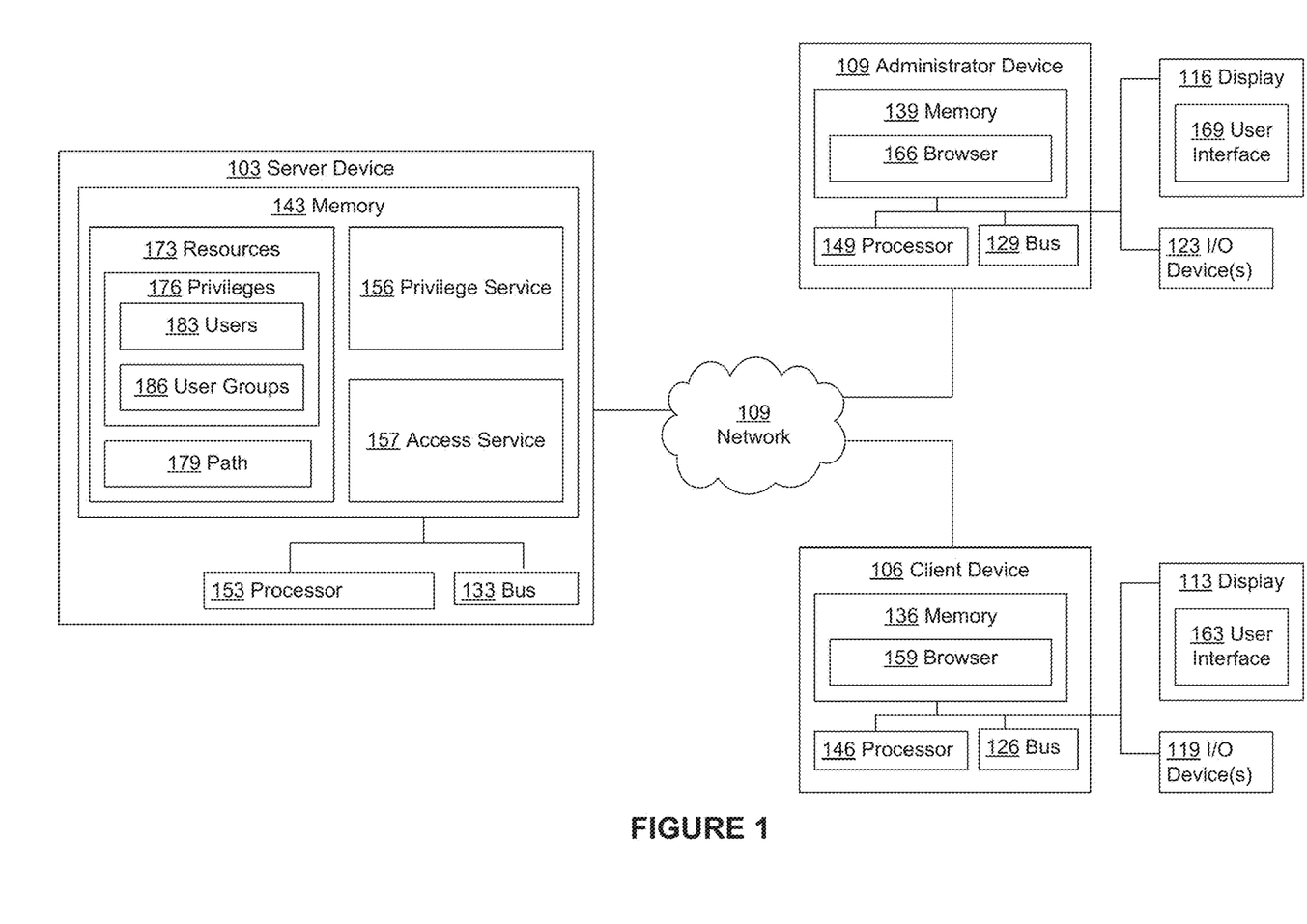
FIG. 1 is a block diagram depicting exemplary computing devices in an exemplary computing environment for implementing certain embodiments.

FIG. 1 depicts an exemplary computing environment for performing searches based on search criteria as described herein. The methods and systems disclosed herein are also applicable on other computing systems and environments. The environment shown in FIG. 1 includes a wired or wireless network 109 connecting various devices 103, 106 and 109. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103, 106 and 109 are respectively used as special purpose computing devices to provide specific functionality offered by their respective applications and by the interaction between their applications. As an example, client device 106 and administrator device 109 are shown with displays 113 and 116, and various input/output devices 119 and 123. A bus, such as bus 126, 129 and 133, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103, 106 and 109 each have a computer-readable medium such as memory 136, 139 and 143 coupled to a processor 146, 149 and 153 that executes computer-executable program instructions and/or accesses stored information. Such processors 146, 149 and 153 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to perform the searching of items based on a received search criteria from the user. For example, the server device 103 may include a privilege service 156 and an access service 157.

As used herein, the term "networked hierarchical repository" refers to a content repository that utilizes a hierarchical content data store with support for structured and unstructured content. The networked hierarchical repository includes shared network drives, internet web pages, intranet web pages, social media platforms, and/or any other system that utilizes hierarchical data. As another example, the CQ product line offered by Adobe® Systems implements a hierarchical repository for web content management.

As used herein, the term "OAuth" refers to the open standard for authorization. OAuth privileges can be assigned to particular users to share and/or access private resources without publicizing credentials. For example, a first user may have stored private resources on a networked hierarchical repository that require providing a set of credentials to access the private resources. The first user may desire to share the private resources with a second user. To this end, a system administrator provides OAuth privileges to the second user for accessing the private resources without having to share the credentials of the first user.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, client device 106 includes a memory 136 that includes a browser 159. The browser 159 renders a user interface 163 on the display 113 associated with the client device 106. The browser 159 may be executed to transmit a request to the server device 103 for accessing resources 173. For example, a user on the client device 106 may request to access the resources 173 by manipulating the user interface 163 rendered on the display 113. The browser 159 may then transmit the request to server device 103 and in response, receive access to the resources 173 based on the privileges 176 assigned by the system administrator. In one embodiment, upon receiving access to the resources 173, the browser 159 may render the resources 173 on the display 113.

The administrator device 109 includes a memory 139 that includes a browser 166. The browser 166 renders a user interface 169 on the display 116 associated with the administrator device 109. The browser 166 may be executed to assign OAuth privileges for accessing resources 173 provided by the server device 103. For example, an administrator on the administrator device 109 requests to assign OAuth privileges to one or more users and/or one or more user groups for accessing the resources 173 by manipulating the user interface 169 rendered on the display 116. The browser 166 may then transmit the request to the server device 103 and, in response, the server device 103 manipulates an OAuth metadata associated with the resources 173, as will be described.

The server device 103 provides the networked hierarchical repository as described herein. In one embodiment, the server device 103 includes a memory 143 that comprises the privilege service 156, the access service 157, and a plurality of resources 173 available for access by one or more users on the client device 106. The resources 173 may be photos, videos, documents, contacts, and/or other media. In one embodiment, each one of the resources 173 is associated with a set of privileges 176 and a path 179. The privileges 176 include operations such as read, write, edit, delete, OAuth and/or other privileges associated with the resources 173. Each privilege 176 may be assigned for one or more users 183 and/or one or more user groups 186. Additionally, the path 179 represents a location of the resource 173 within the networked hierarchical repository. For example, the path 179 may be a uniform resource locator (URL), a directory path, and/or any other identifier of a location within the networked hierarchical repository.

The privilege service 156 receives a request from a system administrator on an administrator device 109 to assign a privilege, such as an OAuth privilege, for access by specified users and/or user groups to private resources 173 associated with a particular user. In one embodiment, the privilege service 156 receives an identification of the resources 173, such as the path 179 and/or some other unique identification. Additionally, the privilege service 156 receives the users 183 and/or user groups 186 that are to receive access to the specified resources 173. For example, the system administrator may provide the relevant data via the user interface 169 rendered on the display 116 of the administrator device 109. The privilege service 156 also receives an OAuth indication for providing authorization to access the resources 173 according to the open standard for authorization. In response, the privilege service 156 invokes an OAuth metadata of the specified resources 173 for providing access to the users 183 and/or user groups 186.

The access service 157 receives a request from a user on a client device 106 to access resources 173 provided by a networked hierarchical repository, i.e., the server device 103. The access service 157 determines whether the user requesting the access has been provided with authorization to access and/or share the specified resources 173. In one embodiment, the access service 157 determines whether an OAuth metadata associated with the specified resources 173 indicates to provide the authorized access to the requesting user. If the OAuth metadata indicates to provide the access, the access service 157 provides access to the specified resources 173 to the requesting user. To this end, the access service 157 determines whether a valid OAuth token is received from the client device 106. For example, a valid OAuth token may include information that indicates a unique user identifier, device identifier, and/or other identifier that indicates the identity of the user and/or device. The access service 157 provides the access to the specified resources 173 if a valid OAuth token is received.

Figure 2:
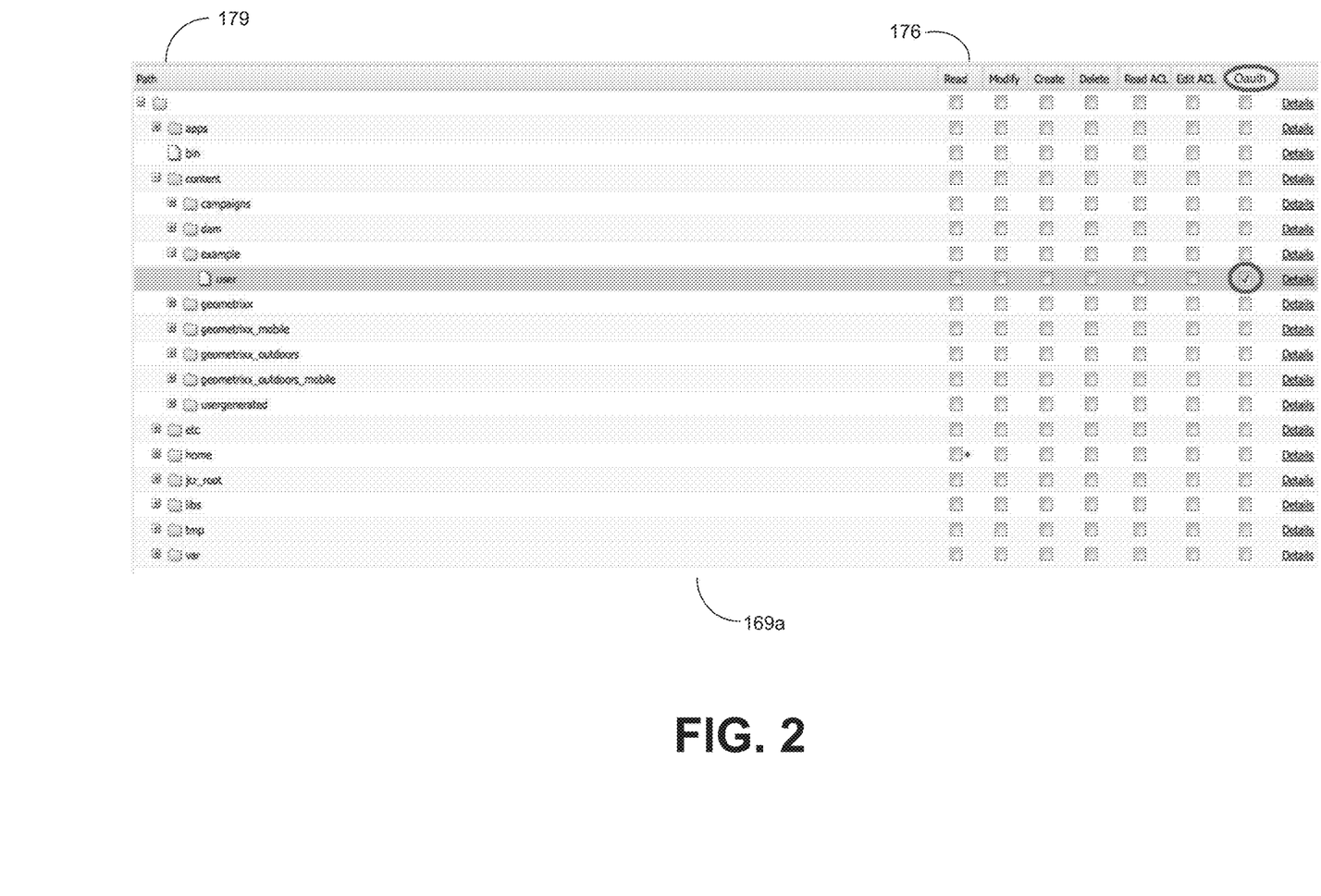
FIG. 2 illustrates an exemplary user interface rendered on a display associated with an administrator device for assigning a set of privileges to one or more paths.

FIG. 2 shows one example of a user interface 169, depicted herein as user interface 169a, according to one embodiment disclosed herein. The graphical components depicted in the user interface 169a such as blocks comprising information shown in FIG. 2 are merely examples of the various types of features that may be used to accomplish the specific function noted. The user interface 169a can be rendered on a display, such as a display 116 (FIG. 1) associated with the administrator device 106 (FIG. 1). In another embodiment, FIG. 2 may be viewed as depicting the display output of the browser 166 (FIG. 1).

As shown in FIG. 2, the user interface 169a is a web page that includes a plurality of paths 179 associated with a networked hierarchical repository and a set of privileges 176 for each folder 203. In one embodiment, the paths 179 depicted in FIG. 2 are a graphical representation of the directory structure of the networked hierarchical repository. Additionally, the privileges 176 represent a graphical representation for assigning a value to a metadata associated with each path 179 to define the respective privilege 176. For example, as shown in FIG. 2, the privileges 176 include a ready privilege, a modify privilege, a create privilege, a delete privilege, a read access control list ("ACL") privilege, an edit ACL privilege and an OAuth privilege.

In one embodiment, a system administrator may assign the privileges 176 shown in FIG. 2 for each one of the depicted paths 179. For example, the system administrator can select one of the boxes shown in FIG. 2 to assign the respective privilege 176. In one embodiment, the system administrator provides an input via one of the I/O devices 123, such as a mouse, a stylus, a keyboard, and/or other device, to select one of the boxes. For instance, the system administrator may select the box to provide OAuth privileges for the path that corresponds to "\content\user," as shown in FIG. 2. Additionally, the system administrator may invoke the "details" link associated with each path 179 to provide a list of one or more users and/or user groups who will have OAuth privileges, as will be described in FIG. 3. The privilege service 156 (FIG. 1) receives the selection and associates the selected privilege 176 with a metadata of the respective path 179.

Figure 3:
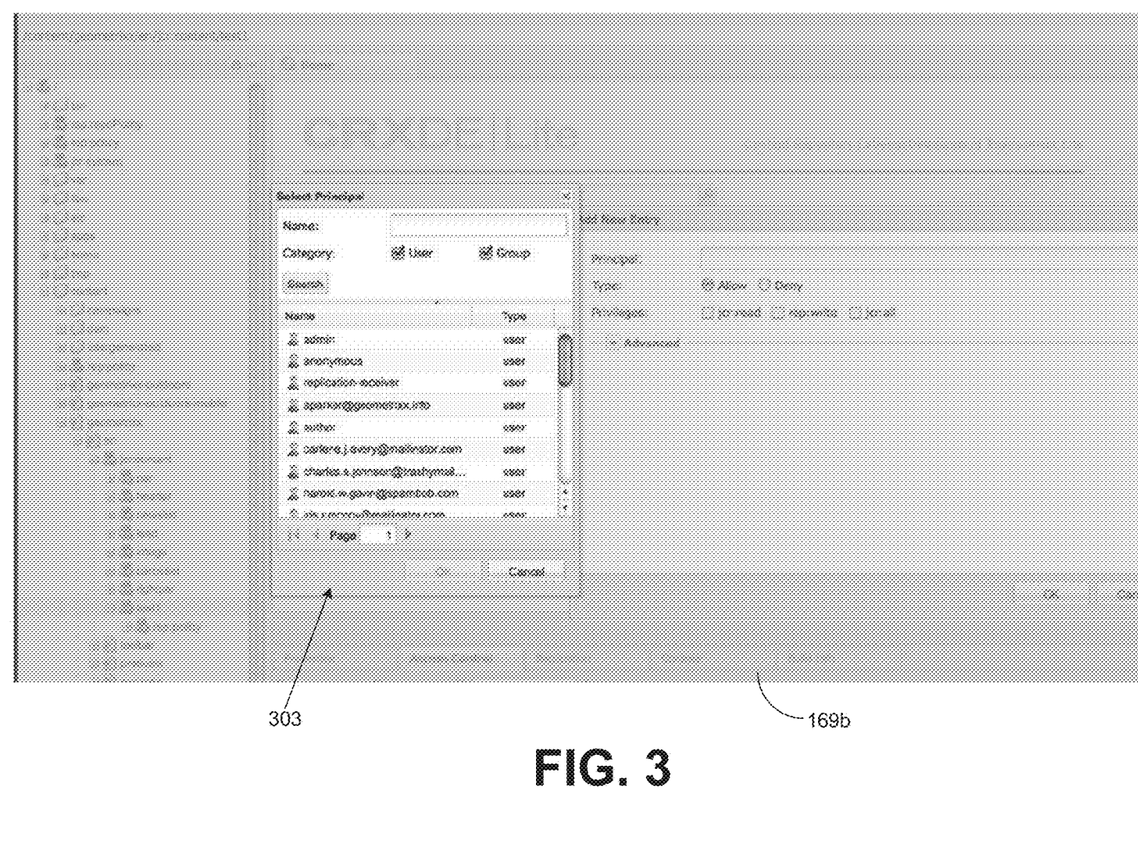
FIG. 3 illustrates an exemplary user interface rendered on a display associated with an administrator device for selecting a set of users and/or a set of user groups to receive the privileges.

FIG. 3 shows one example of a user interface 169, depicted herein as user interface 169b, according to one embodiment disclosed herein. The graphical components depicted in the user interface 169b such as blocks comprising information shown in FIG. 3 are merely examples of the various types of features that may be used to accomplish the specific function noted. The user interface 169b can be rendered on a display, such as a display 116 (FIG. 1) associated with the administrator device 106 (FIG. 1). In another embodiment, FIG. 3 may be viewed as depicting the display output of the browser 166 (FIG. 1).

As shown in FIG. 3, the user interface 169b is a web page that includes a user window 303. In one embodiment, the user window 303 provides for a system administrator to specify one or more users 183 and/or one or more user groups 186 who would be associated with the selected privilege 176. For example, the system administrator may have previously selected the privileges 176 for one or more paths 179 as described above with reference to FIG. 2. As another example, the system administrator may have selected privileges 176 such as read, write, all, and/or other privileges for a path 179 such as "/content/geometrixx/en/jcr:content/test1." This example is depicted in the background portion of FIG. 3. However, the details of the privileges 176 and the path 179 are for illustrative purposes.

The system administrator may then select the users 183 and/or user groups 186 who would receive the privileges 176. In one embodiment, the user window 303 may be rendered on the user interface 169b that includes a listing of available identifiers for users 183 and user groups 186. For example, the users 183 may be identified by a unique email address associated with the user, a user id, a full name, and/or any other identifier. The user groups 186 may be identified by a unique group email address, a group id, a group name, and/or any other identifier. The system administrator may simultaneously select one or more users 183 and/or user groups 186 for receiving the previously assigned privileges 176. The privilege service 156 receives the indication of the users 183 and user groups 186 and associates a metadata associated with the selected path 179 with the specified privileges 176 for the specified users 183 and user groups 186.

Figure 4:
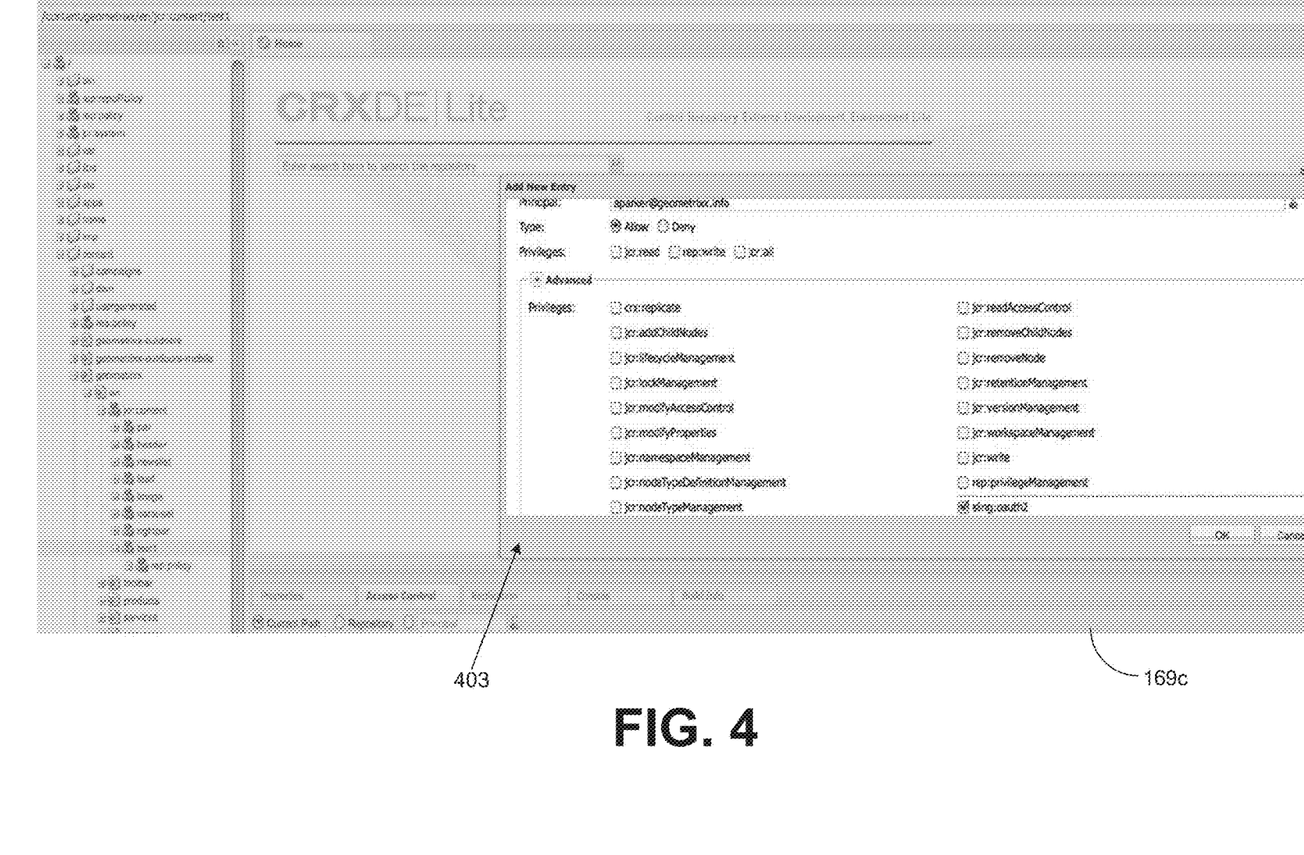
FIG. 4 illustrates an exemplary user interface rendered on a display associated with an administrator device for selecting a set of users and/or a set of user groups to receive the privileges.

FIG. 4 shows one example of a user interface 169, depicted herein as user interface 169c, according to one embodiment disclosed herein. The graphical components depicted in the user interface 169c such as blocks comprising information shown in FIG. 4 are merely examples of the various types of features that may be used to accomplish the specific function noted. The user interface 169c can be rendered on a display, such as a display 116 (FIG. 1) associated with the administrator device 106 (FIG. 1). In another embodiment, FIG. 4 may be viewed as depicting the display output of the browser 166 (FIG. 1).

As shown in FIG. 4, the user interface 169c includes a privilege window 403. In one embodiment, the privilege window 403 provides for a system administrator to assign privileges 176 for each user 183 and/or user group 186. For example, the system administrator may first provide the identifier for the user 183 and/or user group 186 and be presented with a listing for privileges 176 associated with the user 183 and/or user group 186 for a specified path 179. Using the previous example, the system administrator may have previously selected a path to be "/content/geometrixx/en/jcr:content/test1." In response, the system administrator may be presented with the privilege window 403 for providing the users 183 and/or the user groups 186.

In one embodiment, the available privileges 176 may be included in the privilege window 403 from which the system administrator may select for the specified path 179 and the user 183 or user group 186. For example, the system administrator may select one or more boxes associated with any of the privileges 176 presented in the privilege window 403 for providing to the selected user 183 and/or user group 186 for the specified path 179. The privilege service 156 receives the indication of the users 183 and user groups 186 and associates a metadata associated with the selected path 179 with the specified privileges 176 for the specified users 183 and user groups 186.

Figure 5:
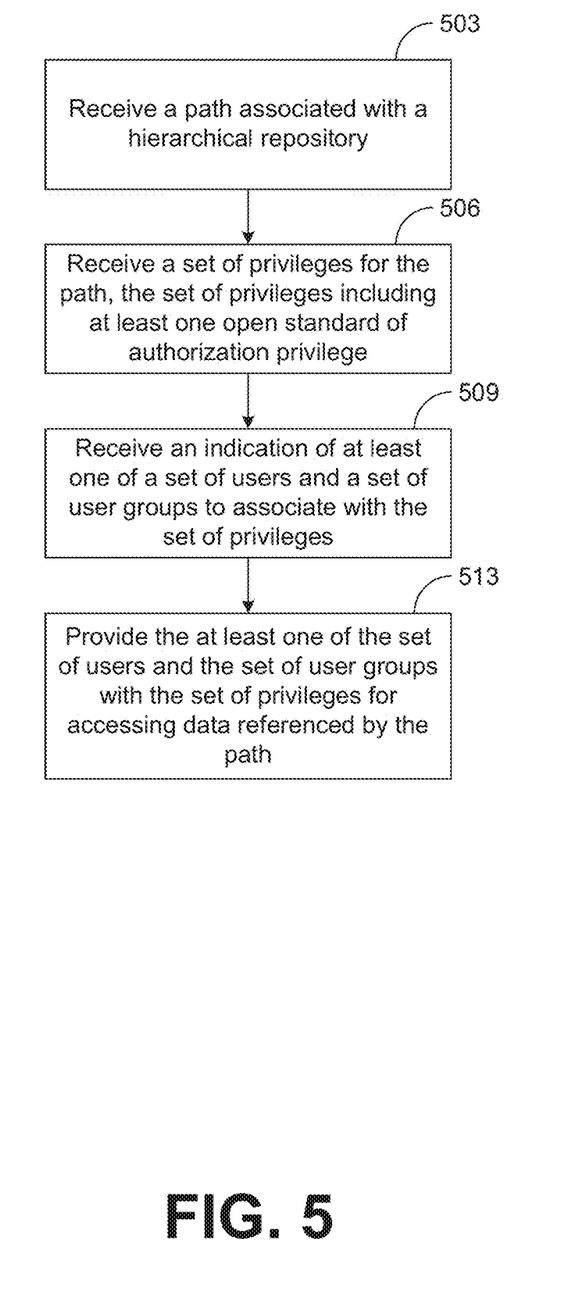
FIG. 5 is a flow chart illustrating an exemplary method of a privilege service for receiving a request to assign a set of privileges for a set of resources and providing the requested privileges for the set of resources.

FIG. 5 is a flowchart that provides one example of the operation of a portion of the privilege service 156 according to certain embodiments. It is understood that the flowchart of FIG. 5 provides merely an example of the many different types of functional arrangements that may be employed to implement the operation of the portion of the privilege service 156 as described herein. As an alternative, the flowchart of FIG. 5 may be viewed as depicting an example of steps of a method implemented in the server device 103 (FIG. 1) according to one or more embodiments.

In step 503, the privilege service 156 receives a path 179 (FIG. 1) associated with a networked hierarchical repository for providing a number of users 183 (FIG. 1) and/or user groups 186 with privileges 176 to the resources 173 (FIG. 1) referenced by the path 179. For example, the path 179 may correspond to a location such as a URL, a directory path and/or another pointer to a location within the networked hierarchical repository. In one embodiment, the resources 173 may be private data that belong to an owner who desires to provide certain privileges 176 to other users or user groups. The owner may request a system administrator to provide the designated privileges 176. In response, the system administer may provide the path 179 that references the private data via a user interface 169 (FIG. 1) rendered on a display 116 (FIG. 1) of an administrator device 109 (FIG. 1). The privilege service 156 being implemented on the networked hierarchical repository (i.e., the server device 103) receives the specified path 179.

Next, in step 506, the privilege service 156 receives a set of privileges 176 for the path 179, the set of privileges 176 include at least one open standard of authorization privilege. The privileges 176 may include a read privilege, a modify privilege, a create privilege, a delete privilege, a read access control list privilege, an edit access control list privilege, an open standard of authorization ("OAuth") privilege, and/or any other privilege. For example, the owner of the private data may wish to provide OAuth privileges to one or more users or user groups to the private data and may request that the system administrator provide these privileges 176. In response, the system administer provides an indication of the OAuth privilege 176. In one embodiment, the system administer manipulates the user interface 169 rendered on the administrator device 109 to select the OAuth privilege 176 to authorize one or more users 183 and/or user groups 186 to access the private data referenced by the path 179. The privilege service 156 being implemented on the networked hierarchical repository (i.e., the server device 103) receives the indication of the OAuth privilege 176.

In step 509, the privilege service 156 receives an indication of at least one of a set of users 183 and a set of user groups 186 to associate with the set of privileges 176. For example, the owner of the private data may wish to provide the OAuth privilege 176 to specific users 183 and/or user groups 186 and my request that the system administer limit the OAuth privileges 176 to the specified users 183 and/or user groups 186. In response, the system administrator provides the specific users 183 and/or user groups 186. In one embodiment, the system administrator manipulates the user interface 169 rendered on the administrator device 109 to indicate the specific users 183 and/or user groups 186 who will have the OAuth privileges 176. The privilege service 156 being implemented on the networked hierarchical repository (i.e., the server device 103) receives the indication of the users 183 and/or user groups 186.

Then, in step 513, the privilege service 156 provides the users 183 and/or the user groups 186 with the privileges 176 for accessing the data referenced by the path 179 of the networked hierarchical repository. For example, the networked hierarchical repository may be based on a REST architecture and be managed according to the JCR platform, as discussed above. As previously discussed, the JCR platform provides for the management of the content in the networked hierarchical repository and the metadata of the content in the networked hierarchical repository. In one embodiment, the privilege service 156 associates the specified privileges 176 and the users 183 and/or user groups 186 to the metadata of the private data referenced by the specified path 179.

Figure 6:
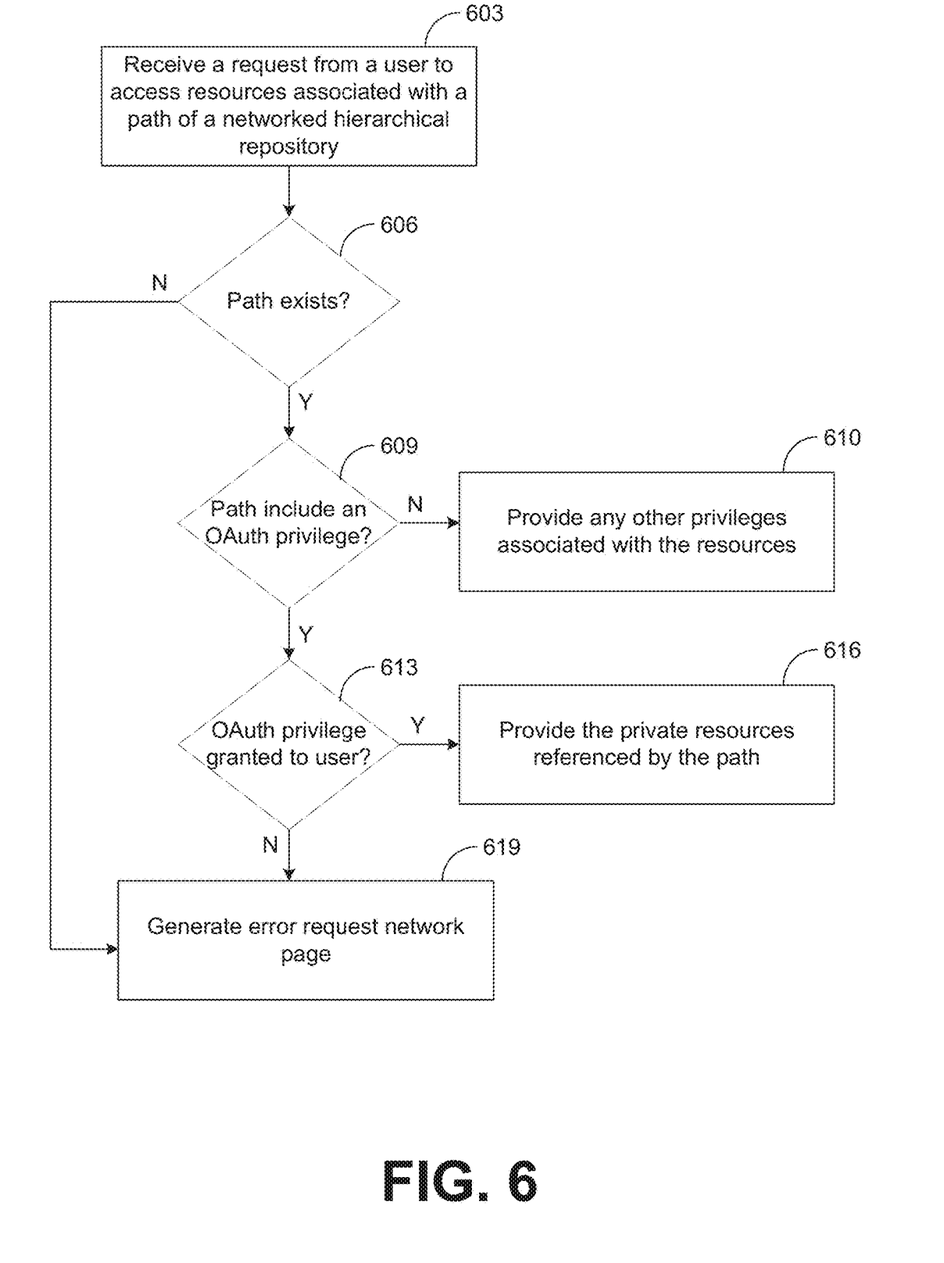
FIG. 6 is a flow chart illustrating an exemplary method of an access service for receiving a request to share the private resources of another user and providing the private resources based on previously assigned privileges.

FIG. 6 is a flowchart that provides one example of the operation of a portion of the access service 157 according to certain embodiments. It is understood that the flowchart of FIG. 6 provides merely an example of the many different types of functional arrangements that may be employed to implement the operation of the portion of the access service 157 as described herein. As an alternative, the flowchart of FIG. 6 may be viewed as depicting an example of steps of a method implemented in the server device 103 (FIG. 1) according to one or more embodiments.

Beginning at step 603, the access service 157 receives a request from a user to access resources 173 associated with a path 179 of a networked hierarchical repository. In one embodiment, the user may transmit the request from a client device 106 by manipulating a user interface 163 using one or more I/O devices 119. The request may include a unique identifier of the resources 176, the path 179 that references the requested resources 173, an identifier for the user 183, an identifier for the user group 186, and/or any other identifying information. Additionally, the user may specifically request to share the resources 173 owned by another user without providing the credentials of the owner. The access service 157 receives the request and determines whether to provide access and/or whether the user is authorized to share the resources 173, as described herein.

In step 606, the access service 157 determines whether the path 179 exists. For example, the access service 157 validates the path 179 by determining whether the components of the path exist. As discussed above, the path 179 may be a URL or a directory address that uniquely identifies the location of the resources 173 in the networked hierarchical repository. The access service 157 verifies that each component of the URL and/or the directory address exists within the networked hierarchical repository. In one embodiment, the access service 157 identifies the path 179 based on the unique identifier of the resources 176 if the path 179 is not provided. For example, the access service 157 may search the networked hierarchical repository for the unique identifier of the resources 176 and determine the path 179 of the location of the resources 176.

If the access service 157 determines that the path 179 does not exist in the networked hierarchical repository, then the access service 157 advances to step 619 and generates an error request network page. For example, the error request network page may be rendered as part of a user interface 163 of client device 106 that includes any information related to the request, such as the path 179, the identifiers for the user 183 and/or user group 186, the identifier of the resources 173, and/or any other information. Returning to step 606, if the access service 157 determines that the path 179 exists in the networked hierarchical repository, then the access service 157 advances to step 609.

In step 609, the access service determines whether the path 179 includes an OAuth privilege 176. In one embodiment, a system administrator of the networked hierarchical repository may have previously associated the OAuth privilege 176 with the path 179. For example, the system administrator may have selected an option to provide the OAuth privilege 176 for certain users 183 and/or user groups 186 to the resources 173 referenced by a path 179 of a hierarchical repository, as discussed above with respect to FIGS. 2-4. The access service 157 determines whether the metadata of the resources 173 associated with the specified path 179 indicates that OAuth privileges 176 have been previously provided to one or more users 183 and/or user groups 186.

If the access service 157 determines that the path 179 does not include an OAuth privilege 176, then the access service 157 advances to step 610 and provides any other privileges 176 associated with the resources 173. For example, the system administrator may have previously associated other privileges with the path 179 such as, a read privilege, a modify privilege, a create privilege, a delete privilege, a read access control list privilege, an edit access control list privilege, and/or other privileges. The access service 157 provides the resources 173 to the user on the client device 106 and along with any specified privileges 176 granted for the user and/or the client device 106 as indicated by the metadata associated with the resource 173.

In step 613, the access service 157 determines whether the OAuth privilege 176 is provided to the requesting user 183. In one embodiment, the system administrator of the networked hierarchical repository may have previously listed one or more users 183 and/or one or more user groups 186 that have OAuth privileges to the resources 173 referenced by the path 179. For example, the system administrator may have provided the users 183 and user groups 186 via a user interface 169 rendered on an administrator device 109, as discussed above with respect to FIGS. 3-4. The access service 157 determines whether the user 183 requesting to share the resources 173 has been previously authorized. To this end, the access service 157 determines whether the metadata of the requested resources 173 indicates that the OAuth privilege 176 is provided to the requesting user 183. For example, the metadata may include a list of users and/or user groups, one of which corresponds to the requesting user 183.

If the access service 157 determines that the OAuth privilege 176 is not provided to the requesting user 183, then the access service 157 advances to step 619 and generates an error request network page. For example, the error request network page may be rendered as part of a user interface 163 of client device 106 that includes any information related to the request, such as the path 179, the identifiers for the user 183 and/or user group 186, the identifier of the resources 173, and/or any other information. The error request network page may also indicate that the requesting user 183 and/or user group 186 is not authorized under the open standard for authorization to share in the private resources 176 of the owner. Returning to step 613, if the access service 157 determines that the path 179 does include an OAuth privilege 176, then the access service 157 advances to step 616.

In step 616, the access service 157 provides the private resources 173 referenced by the path 179 to the requesting user 183. In one embodiment, the access service 157 provides the requesting user 183 with complete access to the private resources 173 without prompting the requesting user 183 for credentials such as a password and/or a passcode. The requesting user 183 may consume the private resources 173 in a manner similar to the owner of the private resources 173, as can be appreciated. In one embodiment, the access service 157 may determine whether the user and/or client device 106 provides a valid token before providing access to the private resources 173 referenced by the path 179, as discussed above.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
receiving, at a server device, one or more selections via a graphical user interface, the one or more selections for assigning an open standard for authentication privilege for a private resource hosted by the server device and owned by a first user to a second user from a set of user or user groups, wherein the private resource comprises a software file in a networked hierarchical repository, and wherein the one or more selections specify: a selected path of the networked hierarchical repository identifying the private resource from a plurality of paths for a plurality of private resources, a first option specifying the open standard for authentication privilege from a set of privileges defining access for the private resource, and a second option specifying the second user from the set of user or user groups;
modifying, via a privilege service executing on the server device, metadata of the private resource identified by the selected path, wherein the metadata comprises a list of permissions identifying users and groups permitted to access the private resource and the metadata is stored in the networked hierarchical repository and associated with the private resource, wherein the privilege service automatically inserts code at the server device to modify the metadata of the private resource to permit the second user to access the private resource via the open standard for authentication privilege; receiving a request to provide the second user with access to the private resource referenced by the selected path of the networked hierarchical repository, wherein the request includes a unique open standard for authentication privilege token provided by the second user;
responsive to determining that the selected path exists in the networked hierarchical repository on the server device, retrieving, from the networked hierarchical repository, the metadata associated with the private resource; and
responsive to determining that the unique open standard for authentication privilege token includes a unique identifier for the second user and that the token corresponds with the second user indicated by the metadata, providing the private resource to the second user without prompting the second user for credentials.

2. The computer-implemented method of claim 1, wherein the networked hierarchical repository is implemented based at least in part on a representational state transfer ("REST") architecture.

3. The computer-implemented method of claim 1, wherein the networked hierarchical repository includes content managed based at least in part on a Java platform specification for access to content repositories ("JCR").

4. The computer-implemented method of claim 1, wherein the networked hierarchical repository includes content comprising at least one of media, documents, and software files.

5. The computer-implemented method of claim 1, wherein the metadata specifies read privileges, modify privileges, and open standard for authentication privileges.

6. The method of claim 1, wherein the one or more selections is received from a third user, further comprising determining whether the third user is authorized to share the private resource.

7. A system comprising:
a processor; and
a non-transitory computer-readable medium communicatively coupled to the processor, wherein the processor is configured to execute program code stored on the non-transitory computer-readable medium for performing operations comprising:
receiving, at a server device, one or more selections via a graphical user interface, the one or more selections for assigning an open standard for authentication privilege for a private resource hosted by the server device and owned by a first user to a second user from a set of user or user groups, wherein the private resource comprises a software file in a networked hierarchical repository, and wherein the one or more selections specify: a selected path of the networked hierarchical repository identifying the private resource from a plurality of paths for a plurality of private resources, a first option specifying the open standard for authentication privilege from a set of privileges defining access for the private resource, and a second option specifying the second user from the set of user or user groups;
modifying, via a privilege service executing on the server device, metadata of the private resource identified by the selected path, wherein the metadata comprises a list of permissions identifying users and groups permitted to access the private resource and the metadata is stored in the networked hierarchical repository and associated with the private resource, wherein the privilege service automatically inserts code at the server device to modify the metadata of the private resource to permit the second user to access the private resource via the open standard for authentication privilege; receiving a request to provide the second user with access to the private resource referenced by the selected path of the networked hierarchical repository, wherein the request includes a unique open standard for authentication privilege token provided by the second user;
responsive to determining that the selected path exists in the networked hierarchical repository on the server device, retrieving, from the networked hierarchical repository, the metadata associated with the private resource; and
responsive to determining that the unique open standard for authentication privilege token includes a unique identifier for the second user and that the token corresponds with the second user indicated by the metadata, providing the private resource to the second user without prompting the second user for credentials.

8. The system of claim 7, wherein the networked hierarchical repository is implemented based at least in part on a representational state transfer ("REST") architecture.

9. The system of claim 7, wherein the networked hierarchical repository includes content managed based at least in part on a Java platform specification for access to content repositories ("JCR").

10. The system of claim 7, wherein the one or more selections is received from a third user, and the operations further comprise determining whether the third user is authorized to share the private resource.

11. The system of claim 7, wherein the networked hierarchical repository includes content comprising at least one of media, documents, and software files.

12. The system of claim 7, wherein the metadata specifies read privileges, modify privileges, and open standard for authentication privileges.

13. A non-transitory computer-readable medium having stored thereon instructions for performing a method comprising machine executable code which when executed by at least one machine, causes the machine to:
receive one or more selections via a graphical user interface, the one or more selections for assigning an open standard for authentication privilege for a private resource hosted by a server device and owned by a first user to a second user from a set of user or user groups, wherein the private resource comprises a software file in a networked hierarchical repository, and wherein the one or more selections specify: a selected path of the networked hierarchical repository identifying the private resource from a plurality of paths for a plurality of private resources, a first option specifying the open standard for authentication privilege from a set of privileges defining access for the private resource, and a second option specifying the second user from the set of user or user groups;
modify, via a privilege service executing on the server device, metadata of the private resource identified by the selected path, wherein the metadata comprises a list of permissions identifying users and groups permitted to access the private resource and the metadata is stored in the networked hierarchical repository and associated with the private resource, wherein the privilege service automatically inserts code at the server device to modify the metadata of the private resource to permit the second user to access the private resource via the open standard for authentication privilege; receive a request to provide the second user with access to the private resource referenced by the selected path of the networked hierarchical repository, wherein the request includes a unique open standard for authentication privilege token provided by the second user;
responsive to determining that the selected path exists in the networked hierarchical repository on the server device, retrieve, from the networked hierarchical repository, the metadata associated with the private resource; and
responsive to determining that the unique open standard for authentication privilege token includes a unique identifier for the second user and that the token corresponds with the second user indicated by the metadata, provide the private resource to the second user without prompting the second user for credentials.

14. The non-transitory computer-readable medium of claim 13, wherein the networked hierarchical repository is implemented based at least in part on a representational state transfer ("REST") architecture.

15. The non-transitory computer-readable medium of claim 13, wherein the networked hierarchical repository includes content managed based at least in part on a Java platform specification for access to content repositories ("JCR").

16. The non-transitory computer-readable medium of claim 13, wherein the networked hierarchical repository includes content comprising at least one of media, documents, and software files.

17. The non-transitory computer-readable medium of claim 13, wherein the metadata specifies read privileges, modify privileges, and open standard for authentication privileges.

18. The non-transitory computer-readable medium of claim 13, wherein the one or more selections is received from a third user, and wherein executing the instructions further causes the machine to determine whether the third user is authorized to share the private resource.

* * * * *